United States Patent
Shakib et al.

(10) Patent No.: US 9,563,803 B2
(45) Date of Patent: Feb. 7, 2017

(54) TAGGING VISUAL MEDIA ON A MOBILE DEVICE

(71) Applicant: GOOGLE TECHNOLOGY HOLDINGS LLC, Mountain View, CA (US)

(72) Inventors: Bakak Robert Shakib, San Jose, CA (US); Denis Otchenashko, Sunnyvale, CA (US); Andrii Tsarov, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 65 days.

(21) Appl. No.: 14/278,186

(22) Filed: May 15, 2014

(65) Prior Publication Data
US 2015/0332086 A1 Nov. 19, 2015

(51) Int. Cl.
*G06K 9/00* (2006.01)
*G06F 17/30* (2006.01)

(52) U.S. Cl.
CPC ..... *G06K 9/00288* (2013.01); *G06F 17/30247* (2013.01); *G06F 17/30268* (2013.01); *G06K 9/00664* (2013.01); *G06T 2207/30201* (2013.01)

(58) Field of Classification Search
CPC ............ G06K 9/00288; G06K 9/00664; G06F 17/30268; G06F 17/30247; G06T 2207/30201
USPC .......................................... 382/118, 181, 218
See application file for complete search history.

(56) References Cited

U.S. PATENT DOCUMENTS

| | | | |
|---|---|---|---|
| 7,870,135 B1 * | 1/2011 | Cheung | G06Q 30/0601 707/737 |
| 8,379,939 B1 | 2/2013 | Bourdev et al. | |
| 8,411,953 B2 | 4/2013 | Deluca et al. | |
| 8,566,177 B2 * | 10/2013 | Chang | G06Q 30/02 705/26.1 |
| 8,566,329 B1 * | 10/2013 | Freed | G06F 17/3053 707/748 |
| 8,589,497 B2 * | 11/2013 | Balasubramanian | G06Q 10/10 709/206 |
| 2007/0174247 A1 | 7/2007 | Xu et al. | |
| 2007/0250496 A1 * | 10/2007 | Halliday | G06F 17/30265 |
| 2008/0065995 A1 * | 3/2008 | Bell | G06F 17/218 715/751 |
| 2008/0082463 A1 * | 4/2008 | Cheng | G06N 99/005 706/12 |

(Continued)

OTHER PUBLICATIONS

PCT/US2015/029757 International Search Report and Written Opinion, Mailed Aug. 6, 2015.

*Primary Examiner* — Samir Ahmed
(74) *Attorney, Agent, or Firm* — Troutman Sanders LLP; James E. Schutz; Christopher C. Close, Jr.

(57) ABSTRACT

This document describes techniques enabling tagging of visual media on a mobile device. In some cases the techniques determine, based on meeting a threshold of manual tagging of a person or object, to "bulk" tag visual media stored on the mobile device. Thus, the techniques can present, in rapid succession, photos and videos with the recognized person or object to enable the user to quickly and easily confirm or reject the recognition. Also, the techniques can present numerous faces for recognized persons or sub-images for recognized objects on a display at one time, thereby enabling quick and easy confirmation or rejection of the recognitions.

11 Claims, 9 Drawing Sheets

(56) References Cited

U.S. PATENT DOCUMENTS

2009/0006374 A1\* 1/2009 Kim .................. G06F 17/30699
2010/0082576 A1\* 4/2010 Walker .............. G06F 17/30038
   707/706
2011/0307542 A1 12/2011 Wang et al.
2012/0114199 A1\* 5/2012 Panyam ............. G06K 9/00288
   382/118

\* cited by examiner

TAGGING VISUAL MEDIA ON A MOBILE DEVICE

BACKGROUND

This background description is provided for the purpose of generally presenting the context of the disclosure. Unless otherwise indicated herein, material described in this section is neither expressly nor impliedly admitted to be prior art to the present disclosure or the appended claims.

Current techniques for tagging visual media, such as photos and video clips, can be time consuming and cumbersome. A user of a smart phone, for example, may manually tag a photo to indicate that a particular face in the photo is that of her friend by selecting a tagging interface, selecting the photo, tapping on the face of her friend, and then selecting the friend's name from a contact list or instead type in the friend's name. This is cumbersome even for one person in one photo—for many persons or objects in many photos or videos, tagging visual media can result in a time-consuming and cumbersome user experience.

BRIEF DESCRIPTION OF THE DRAWINGS

Techniques and apparatuses for tagging visual media on a mobile device are described with reference to the following drawings. The same numbers are used throughout the drawings to reference like features and components.

DETAILED DESCRIPTION

This document describes techniques enabling tagging of visual media on a mobile device. In some cases the techniques determine, based on meeting a threshold of manual tagging of a person or object, to "bulk" tag visual media stored on the mobile device. Thus, the techniques can present, in rapid succession, photos and videos with the recognized person or object to enable the user to quickly and easily confirm or reject the recognition. Also, the techniques can present numerous faces for recognized persons or sub-images for recognized objects on a display at one time, thereby enabling quick and easy confirmation or rejection of the recognitions. The threshold can be based on a number of tagging selections or an accuracy threshold being met base on manual tagging having been performed. This can enable, in some cases, a high degree of confidence in the recognitions performed, thereby reducing the chances that a user will need to correct or reject a recognition.

The following discussion first describes an operating environment followed by techniques that may be employed in this environment and proceeding with example user interfaces and apparatuses.

Figure 1:
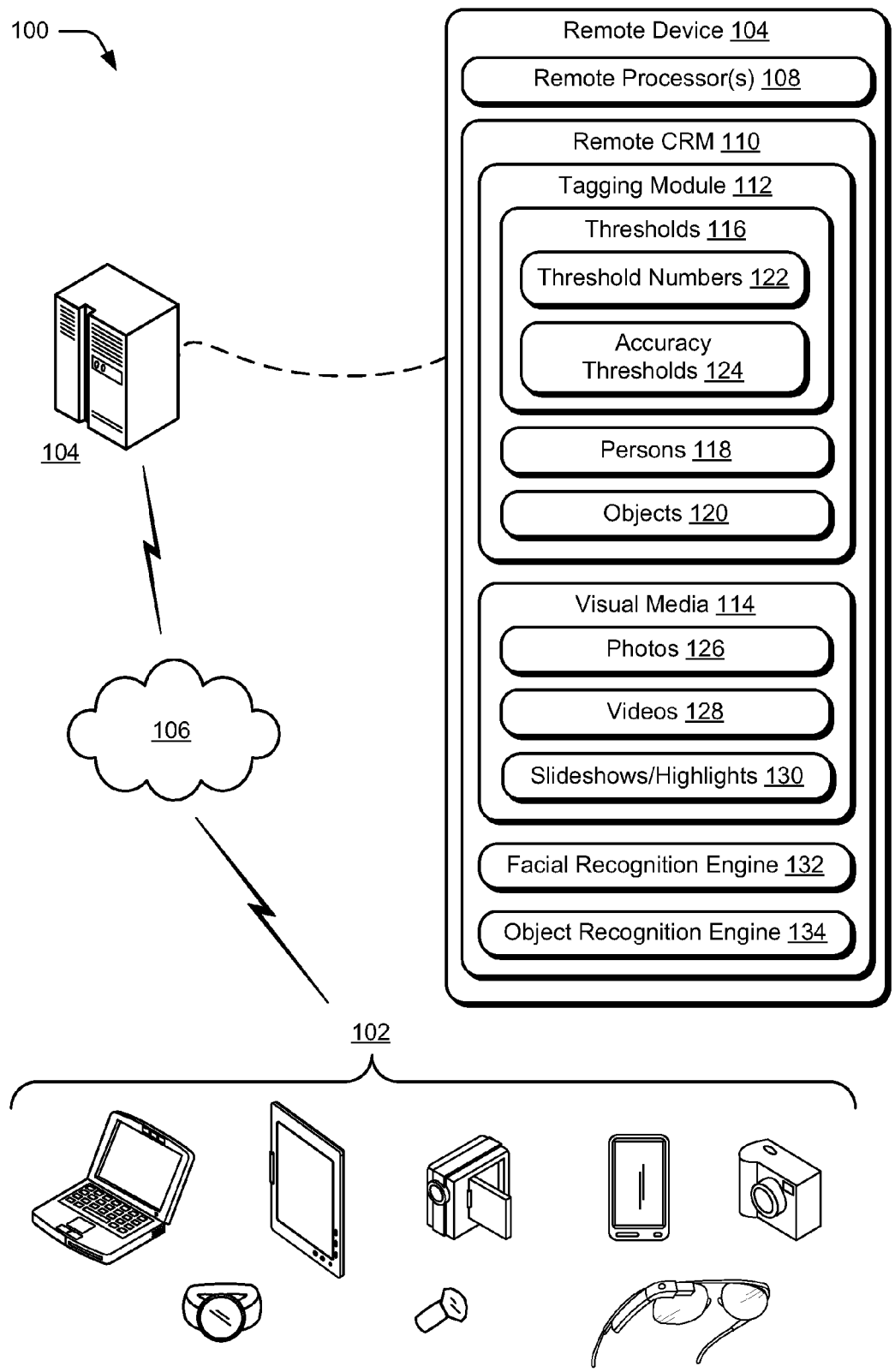
FIG. 1 illustrates an example environment in which techniques for tagging visual media on a mobile device can be implemented.

FIG. 1 illustrates an example environment 100 in which techniques for tagging visual media on a mobile device and other techniques related to visual media can be implemented. Environment 100 includes a computing device 102, a remote device 104, and a communications network 106. The techniques can be performed and the apparatuses embodied on one or a combination of the illustrated devices, such as on multiple computing devices, whether remote or local. Thus, a user's smartphone may capture (e.g., take photos or video) or receive media from other devices, such as media previously uploaded by a friend from his or her laptop to remote device 104, directly from another friend's camera through near-field communication, on physical media (e.g., a DVD or Blu-ray disk), and so forth. Whether from many or only one source, the techniques are capable of tagging visual media that is on the user's mobile device or associated with the user's mobile device, even if the visual media was not captured at the mobile device.

In more detail, remote device 104 of FIG. 1 includes or has access to one or more remote processors 108 and remote computer-readable storage media ("CRM") 110. Remote CRM 110 includes tagging module 112 and visual media 114. Tagging module 112 is capable of determining that a manual tagging selection meets or exceeds a threshold, performing facial or object recognition on multiple visual images, enabling selection to confirm or reject the recognitions, and tagging or reversing a tag in response. This threshold can be a number of manual tags, a total number of manual and non-manual tags, a number of manual tags within some period of time, and/or an accuracy threshold being met for a recognition engine based on the manual tagging.

In more detail, tagging module 112 includes thresholds 116, persons 118, and objects 120. Thus, each of persons 118 or objects 120 may include a threshold 116 that, when met, may prompt tagging module 112 to perform methods noted herein. Thresholds 116 can be a manual-selection tagging threshold that exceeds a tagging threshold number 122, such as when a user manually tags one of persons 118 a $10^{th}$ time. Note that this $10^{th}$ tagging of a person can be ten manual tags or a combination of manual and non-manual tags, such as a tenth total tag that is manual but where four of the ten total tags are received from other manners. These other tags can be received or determined through social media or other manners, which may themselves be manual or non-manual tags.

Thresholds can also be based on a number of manual selections with a tagging threshold time. Thus, tagging module 112 may perform object recognition on numerous previously untagged photos and video when a user manually tags five photos within three minutes. This number and time can indicate that a user wishes to tag many different visual media, and thus bulk recognition and tagging can be performed to aid the user.

Further still, thresholds 116 can be an accuracy threshold 124 determined based on a particular accuracy being likely for a recognition engine using manually-selected tagging alone or in combination with other manners in which to improve recognition accuracy. In such a case a threshold number may not be determinative, as a small number of manual and/or non-manual tagging, based on faces, visual quality, facial orientations, and so forth may be sufficient to meet accuracy threshold 124 for a particular person 118 or object 120.

Also, thresholds 116 can be based on a combination of threshold numbers 122 and accuracy thresholds 124. Tagging module 112 may determine that bulk tagging is appropriate responsive to manual and non-manual tags sufficient to meet an accuracy threshold 124 in conjunction with a sufficient number of manual tagging selections received through computing device 102 to indicate that a user desires to bulk tag his or her visual media 114.

Visual media 114 includes photos 126, videos 128, and slideshows/highlights 130. Videos 128 and slideshows/highlights 130 can include audio, and can also include various modifications, such as songs added to a slideshow, transitions between images or video in a highlight reel, and so forth. Other types of visual media can also be included, these are illustrated for example only.

Remote CRM 110 also includes facial recognition engine 132 and object recognition engine 134. Tagging module 112 may use these engines to recognize persons and objects (e.g., persons 118 and objects 120) within visual media 114. These engines can recognize people and objects often with improved accuracy or confidence based on prior tagging. Confidence in a recognition can affect how the techniques enable confirmation/rejection of a recognition, which is described further below.

Figure 2:
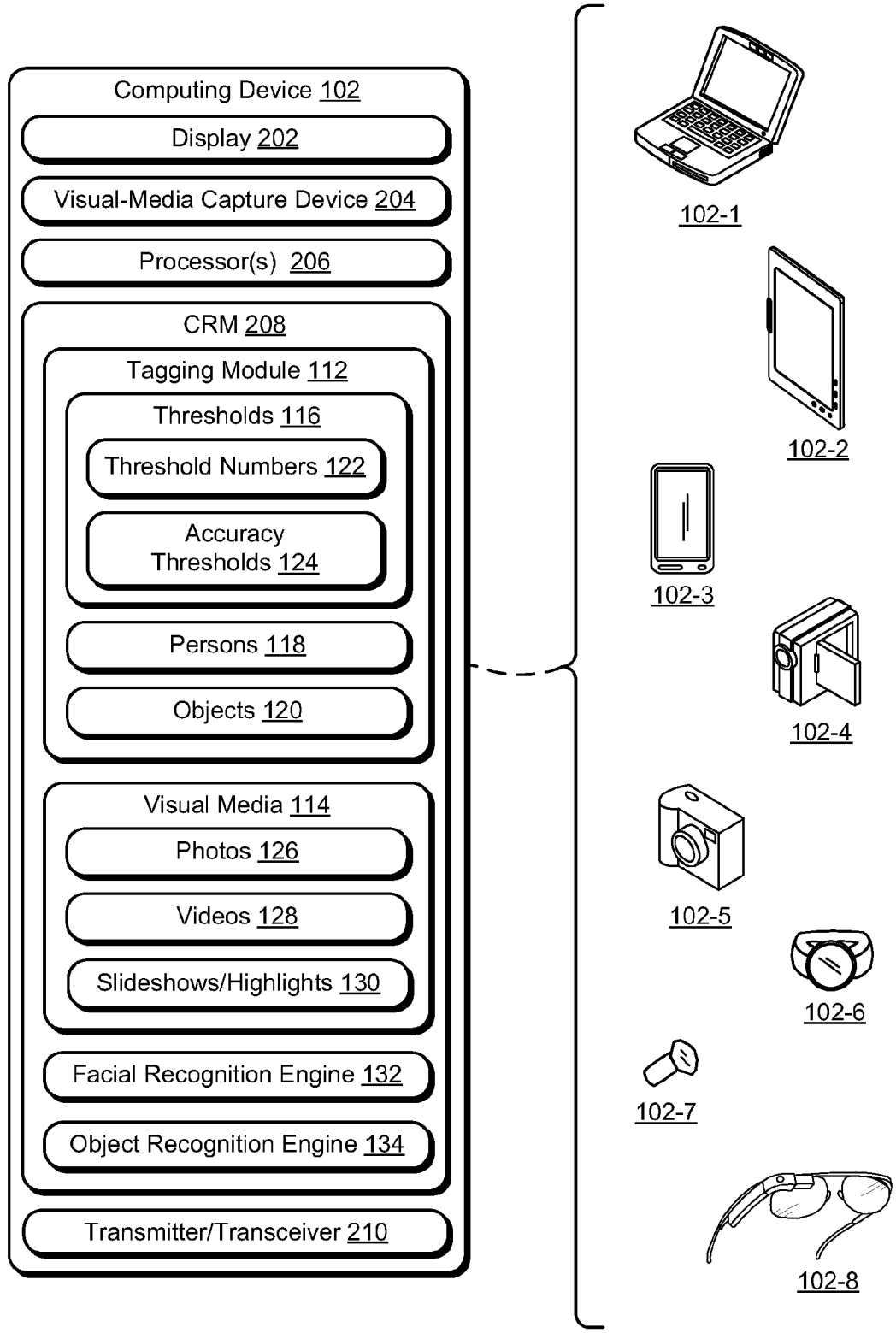
FIG. 2 illustrates a detailed example of a computing device shown in FIG. 1.

With regard to the example computing device 102 of FIG. 1, consider a detailed illustration in FIG. 2. Computing device 102 can each be one or a combination of various devices, here illustrated with eight examples: a laptop computer 102-1, a tablet computer 102-2, a smartphone 102-3, a video camera 102-4, a camera 102-5, a computing watch 102-6, a computing ring 102-7, and computing spectacles 102-8, though other computing devices and systems, such as televisions, desktop computers, netbooks, and cellular phones, may also be used. As will be noted in greater detail below, in some embodiments the techniques operate through remote device 104. In such cases, computing device 102 may forgo performing some of the computing operations relating to the techniques, and thus need not be capable of advanced computing operations.

Computing device 102 includes or is able to communicate with a display 202 (eight are shown in FIG. 2), a visual-media capture device 204 (e.g., an analog or digital camera), one or more processors 206, computer-readable storage media 208 (CRM 208), and a transmitter or transceiver 210. CRM 208 includes (alone or in some combination with remote device 104) tagging module 112, visual media 114, thresholds 116, persons 118, objects 120, threshold numbers 122, accuracy thresholds 124, photos 126, videos 128, slideshows/highlights 130, facial recognition engine 132, and object recognition engine 134. Thus, the techniques can be performed on computing device 102 with or without aid from remote device 104. Transmitter/transceiver 210 can communicate with other devices, such as remote device 104 through communication network 106, though other communication manners can also be used, such as near-field-communication or personal-area-network communication.

These and other capabilities, as well as ways in which entities of FIGS. 1 and 2 act and interact, are set forth in greater detail below. These entities may be further divided, combined, and so on. The environment 100 of FIG. 1 and the detailed illustration of FIG. 2 illustrate some of many possible environments capable of employing the described techniques.

Example Methods for Tagging Visual Media

Figure 3:
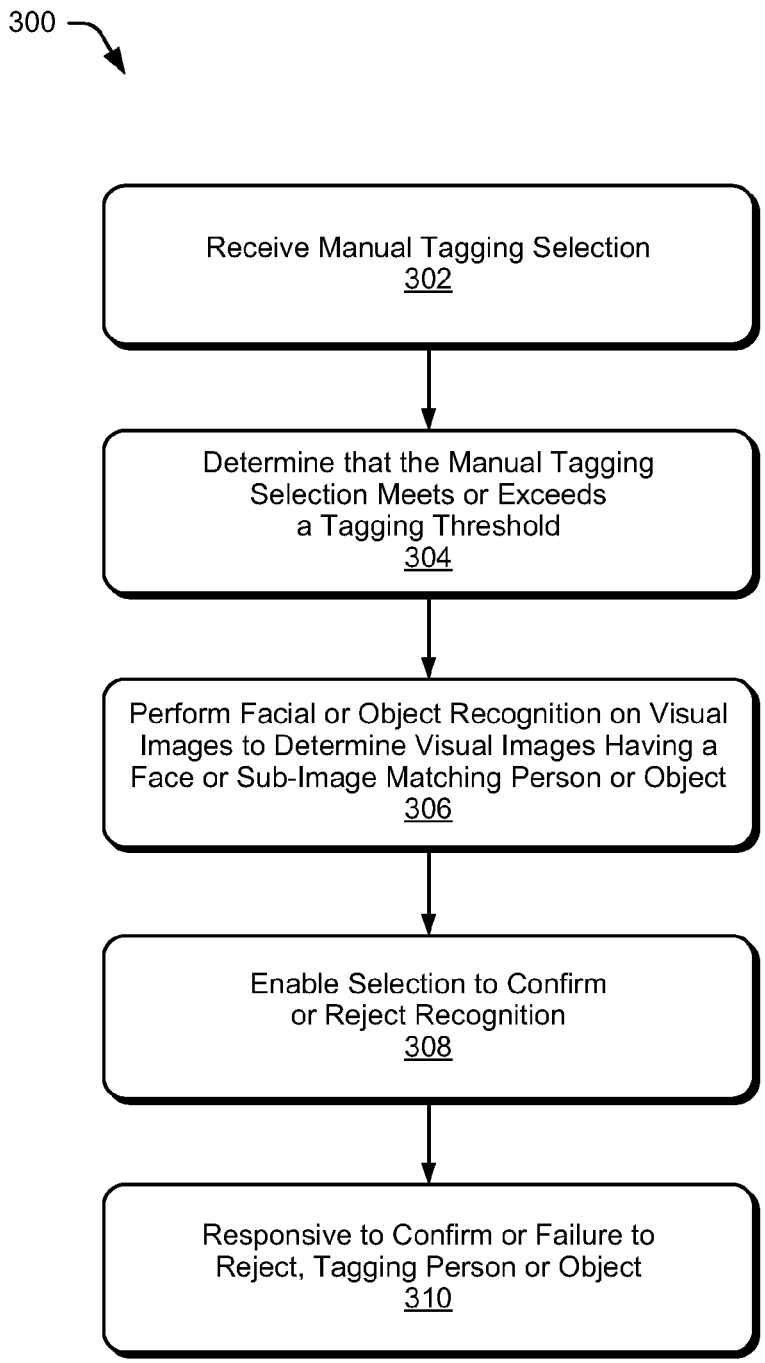
FIG. 3 illustrates example methods for tagging visual media on a mobile device.

FIG. 3 illustrates example methods 300 for tagging visual media. The order in which method blocks for these and other methods described herein is not intended to be construed as a limitation, and any number or combination of the described method blocks can be combined in any order to implement a method, or an alternate method. Further, methods described can operate separately or in conjunction, in whole or in part. While some operations or examples of operations involve user interaction, many of the operations can be performed automatically and without user interaction.

At 302, a manual tagging selection to tag a person or object is received. This manual tagging selection can be received through a mobile device, such as through a gesture-sensitive display of computing device 102 of FIGS. 1 and 2. Thus, a user may select a stored or newly-captured photo or video and select to tag a person or object in the photo.

Figure 4:
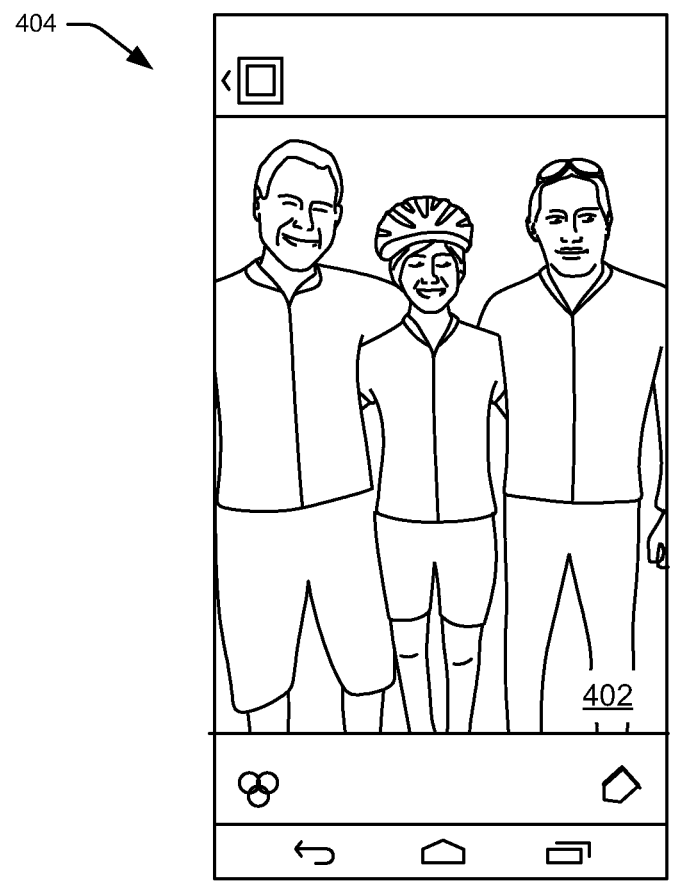
FIG. 4 illustrates a photo of three friends.
Figure 5:
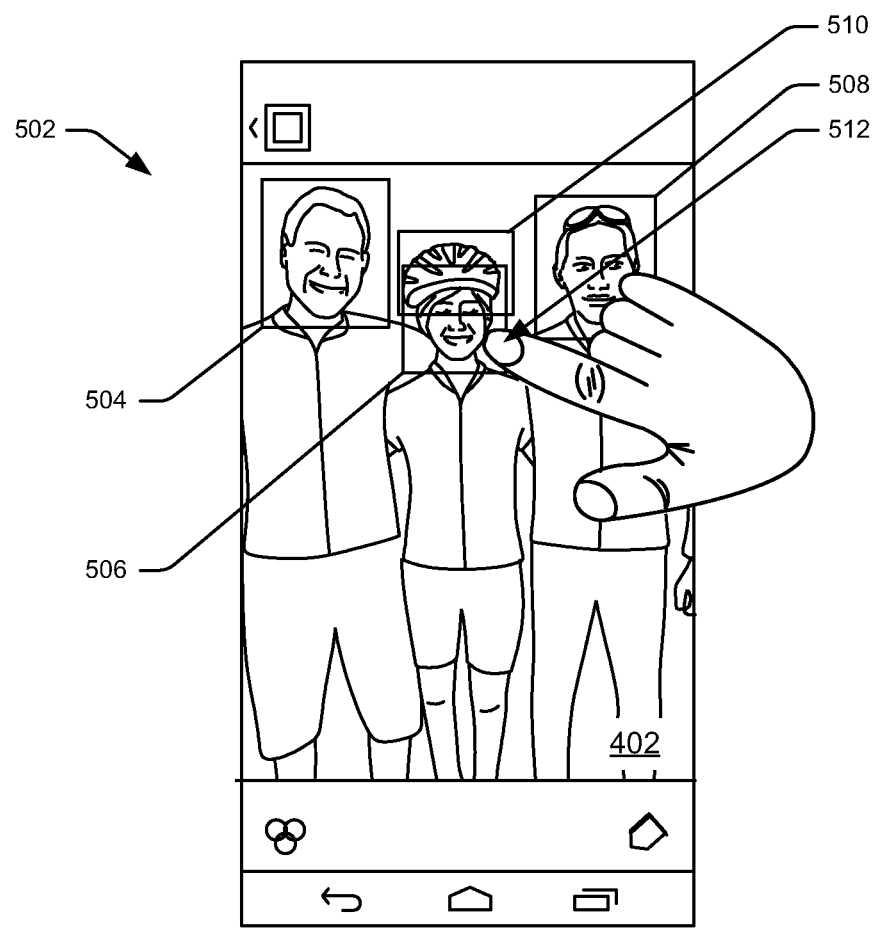
FIG. 5 illustrates the photo of FIG. 4 with a tagging interface, three faces, and a sub-image for an object.

By way of example, consider FIG. 4, which illustrates a newly-captured photo 402 of a user and her two friends on a hike trip, the photo captured through her smartphone 102-3 (shown in FIG. 2), and shown in a media user interface 404 on the smartphone's display. The user may select to manually tag by selecting a face or sub-image of photo 402 with our without assistance from one of engines 132 and 134. Here assume that facial recognition engine 132 and object recognition engine 134 each provide selectable regions for tagging. This is shown in FIG. 5, which illustrates photo 402 with a tagging interface 502 having a first face 504, a second face 506, a third face 508, and a sub-image 510. Sub-images are portions of visual media in which an object may reside, such as a bicycle helmet shown at sub-image 510. Note also that a manual tagging selection 512 is received through a gesture selection to tap second face 506 (a person named "Bella").

At 304, the manual tagging selection is determined to meet or exceed a tagging threshold for the selected person or object. As noted in part above, determining that the manual tagging selection meets or exceeds a tagging threshold can be a determination that the selection exceeds a threshold number, such as by being a 15$^{th}$ tagging of the person tapped through manual tagging selection 512 of FIG. 5. In some cases, tagging module 112 determines that the manual tagging selection meets or exceeds a threshold number within a threshold time, such as being a third selection of the same person within two minutes. Manual tagging a person or object multiple times or "in a row" can indicate a user's desire to tag many photos or videos, and therefore prompt tagging module 112 to analyze numerous media for the user.

At 306, facial or object recognition is performed on multiple visual images to determine visual images having a face or sub-image recognized as matching the person or the object tagged with the manual tagging selection. Tagging module 112, along with facial recognition engine 132, analyzes many visual media to find the person or object, such a majority of visual media 114 or all or substantially all of visual media 114 on which recognition for the person or object has not yet been performed.

Continuing the ongoing example, assume that the user of the smart phone (Bella) has 396 photos, 112 videos, and three highlight reels (a slide-show-like video highlighting photos and videos, usually with accompany audio, transitions, and so forth). Note that facial recognition engine 132's accuracy and confidence can be improved based on the manual tagging selections made by Bella, here that she has selected to manually tag herself (Bella) five times in the last five minutes, for example, though non-manual tagging may also aid in recognition. Here five manual tags aid in accurate recognition. Tagging module 112, along with facial recognition engine 132, analyzes 392 photos (four were already tagged as Bella), 111 videos (one was already tagged as Bella), and the three highlight reels. Assume here that the results include 14 photos and two videos having a face recognized to be Bella.

At 308, selection is enabled to confirm or reject the face or sub-image recognized as matching the person or object in each of the determined visual images. This can be through presenting the determined visual images with indicia indicating the face or the sub-image. Further, tagging module 112 can present the determined visual images in rapid succession, such as through a fast slideshow of the images having the face or sub-image. In such a case failing to reject the face or the sub-image can include not selecting the image during the rapid succession.

Figure 6:
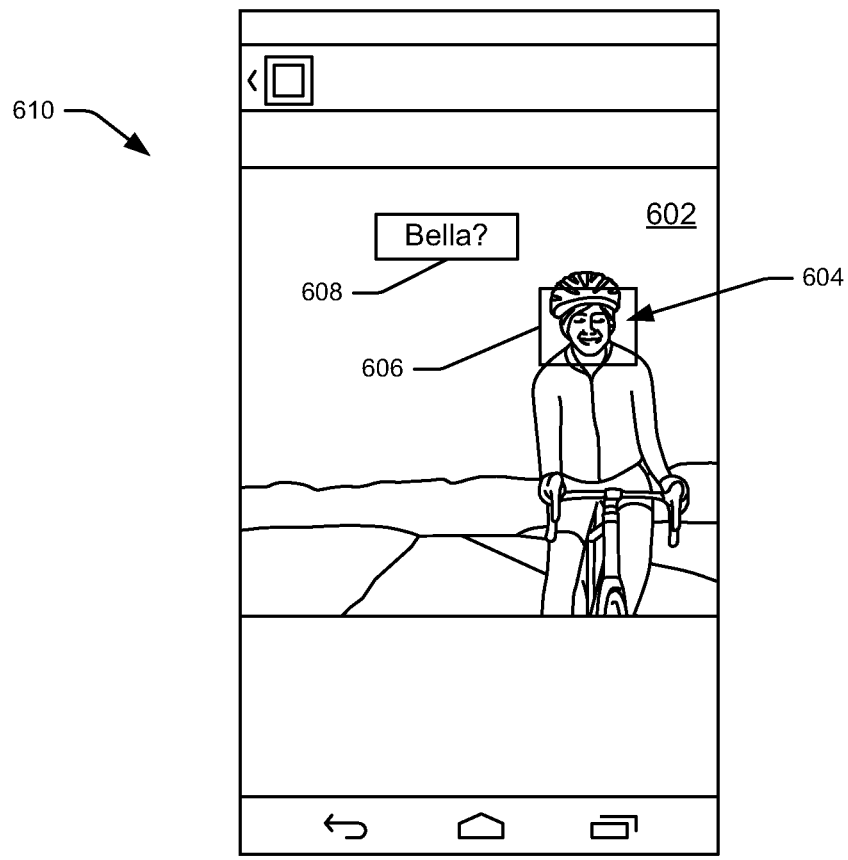
FIG. 6 illustrates a single-image confirmation/rejection interface through which a user may select to confirm or reject a recognition.

Consider, by way of example, FIG. 6, which illustrates a determined visual image 602 having a face 604 recognized as Bella. Here the indicia is a box 606 and text 608 of "Bella?", though just a box, highlight, and the like can be used. In some cases the face or sub-image is presented at a higher resolution than other portions of the image thereby providing indicia of what a user is to consider when deciding to confirm or reject, such as Bella's face at a high resolution and the remainder of determined visual image 602 being at a lower resolution, made semi-opaque, or "clouded."

As noted, in this example 16 visual media (14 photos and two videos) are determined through tagging module 112 performing facial recognition on visual media 114 on Bella's smartphone 102-3. Determined visual image 602 is one of those 14 photos. Here assume that tagging module 112 presents the 16 in rapid succession through single-image confirmation/rejection interface 610. Also assume that the user (here Bella), lets each photo and video pass without rejecting them, thereby permitting tagging module 112 to tag each of these 16 visual media as including Bella. Note that a portion, even as little as a single image, of a video may be presented in this rapid succession. Thus, a one- or two-second portion of a video in which a face or sub-image is recognized can be presented, rather than much or all of the video. Further, this portion of the video may also be presented at an adjusted (e.g., double or triple) speed.

Tagging module 112 may also or instead enable selection to confirm or reject the face or sub-image recognized as matching the person or the object by presenting portions of the determined visual images at one time or in one interface. Thus, instead of presenting the visual photo (e.g., the photo or a still image of a video or slideshow or highlight reel), tagging module 112 presents multiple portions at once.

Figure 7:
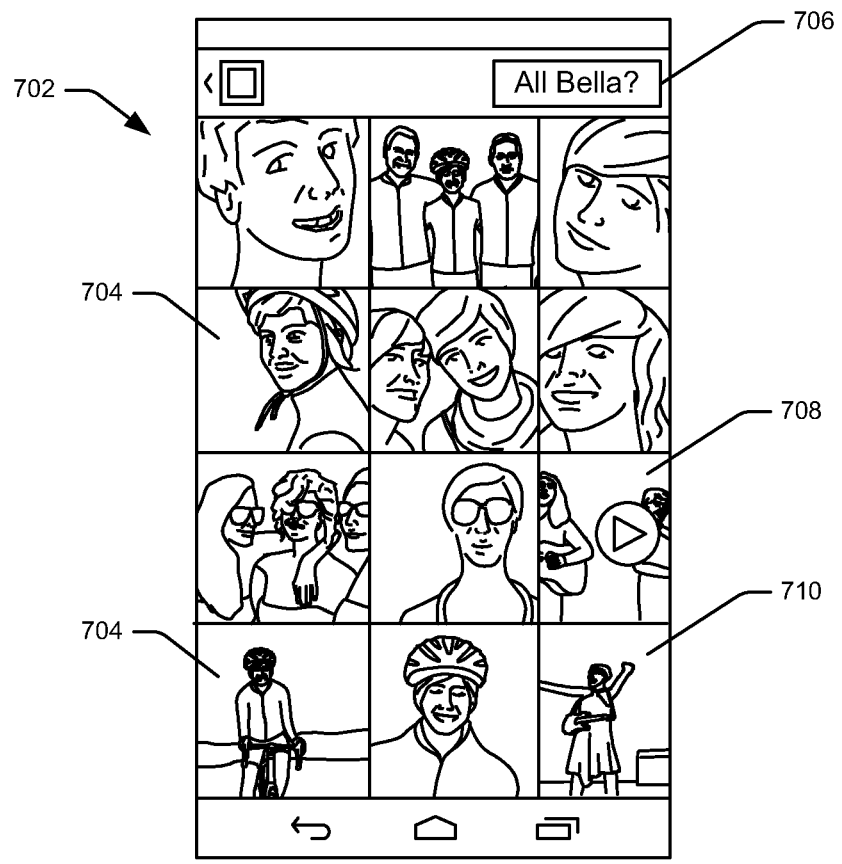
FIG. 7 illustrates a multi-image confirmation/rejection interface through which a user may select to confirm or reject one or more recognitions.

By way of example, consider FIG. 7, which illustrates multi-image confirmation/rejection interface 702. This interface 702 presents 12 of the 16 visual media, each with a portion 704 of the visual media relevant to the face recognized as Bella. Here tagging module 112 permits explicit selection to confirm or reject, or implicit by allowing the interface to simply proceed to show other visual media in which Bella is recognized. Here a confirmation control 706 is provided for explicit selection to confirm that Bella is correctly recognized in all of these 12 visual media.

Assume, however, that Bella does not think that she is in video 708 or photo 710. She may select to reject or select to see more, such as to tap on video 708 to see a larger version, all of the video, or other still images in video 708 in which tagging module 112 has determined Bella is recognized.

Tagging module 112 may also present these single and multiple determined visual media based on a confidence that the recognition is correct. Thus, tagging module 112 may speed up presentation of determined images in single-image confirmation/rejection interface 610 based on the confidence, thus, those images in which the recognition has a high confidence can be presented more quickly than those with a lower confidence. Similarly, tagging module 112 may present fewer portions and/or a larger size for multi-image confirmation/rejection interface 702 of FIG. 7. Tagging module 112 can present the 12 of the 16 determined visual media with the highest confidence in one interface and the remaining four with lower confidence at a larger size in a second interface, for example.

Returning to methods 300, after enabling selection at 308, at 310 persons or objects are tagged responsive to confirming or failing to reject the recognition.

Figure 8:
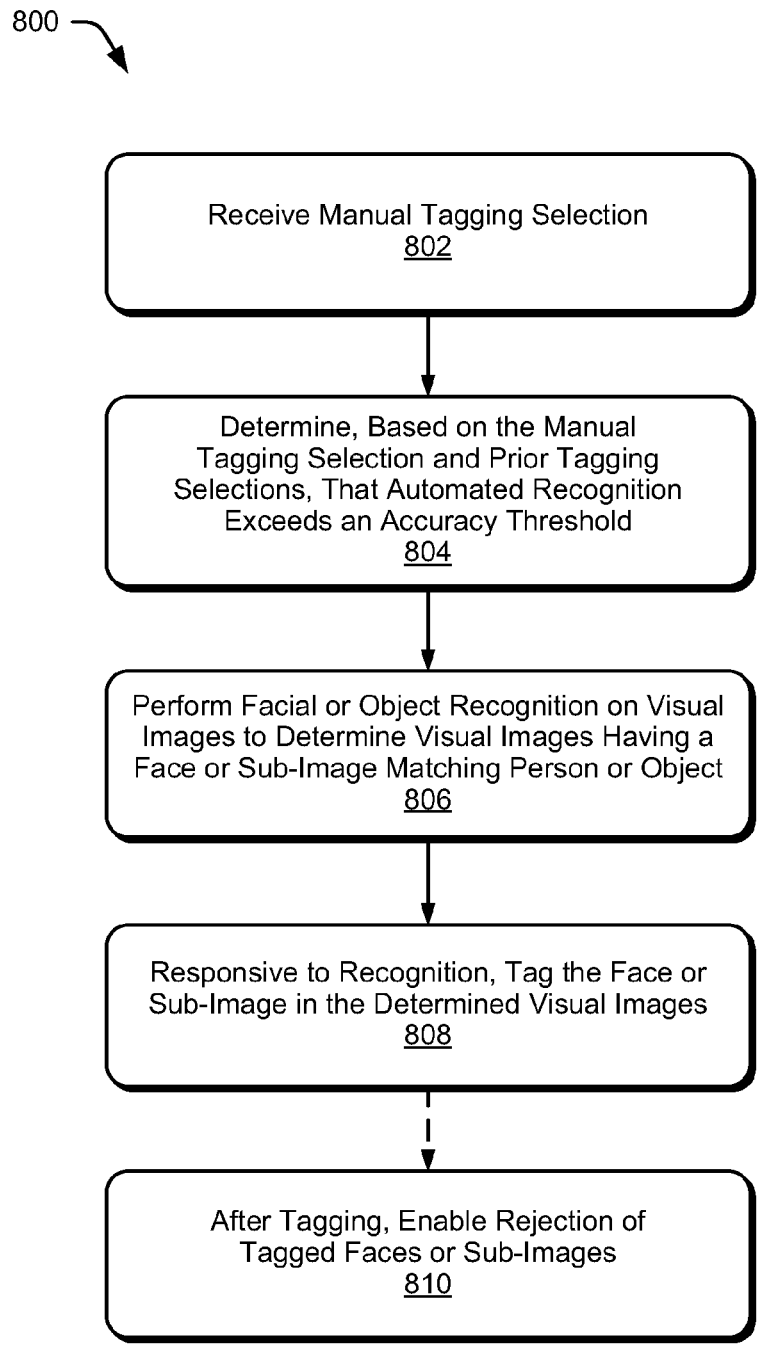
FIG. 8 illustrates example methods for tagging visual media, including automatically based on an accuracy threshold.

FIG. 8 illustrates example methods 800 for tagging visual media, including automatically based on an accuracy threshold. Methods 800 may operate as an alternative or in conjunction with methods 300, in whole or in part.

At 802, a manual tagging selection to tag a person or object is received, similar to as described for operation 302 of methods 300.

At 804, it is determined that automated recognition of the person or object can be performed at or exceeding an accuracy threshold. Determining that the automated recognition exceeds an accuracy threshold may include facial or object factors of the person or the object manually or non-manually tagged in other visual images, rather than a simple number of manual tagging having been performed. The facial or object factors usable by facial recognition engine 132 or object recognition engine 134 are used to establish or improve recognition accuracy to the accuracy threshold.

As noted, this accuracy threshold is based at least in part on the manual tagging selection and prior manual or non-manual tagging selections of the person or object, whether performed at computing device 102 or received, such as through social networks. Thus, after a recent manual tagging selection of Bella in FIG. 5, and based on nine prior tagging selections of Bella, tagging module 112 may determine that facial recognition engine 132 is capable of recognizing Bella in other visual media at a high accuracy. This accuracy threshold can be set by default or selection, such as a user selecting a 90%, 95%, or 99% threshold for automatically tagging visual media.

This accuracy threshold can be determined or tested by tagging module 112 by performing facial or object recognition on visual images in which the person or object has previously been tagged. Thus, if Bella tags herself in ten images, tagging module 112 may analyze these ten images to determine the accuracy of recognizing Bella in those ten images as a test of the accuracy of the recognition engine. If the manual tagging matches the recognized faces all ten times, the accuracy for future recognitions is determined to be high (though not 100%).

At 806, facial or object recognition on multiple visual images is performed. In so doing, tagging module 112 determines visual images having a face or sub-image recognized as matching the person or the object.

At 808, tagging of the face or the sub-image in the determined visual image is performed responsive to the facial or object recognition. This can be performed automatically and without user interaction other than the manual tagging as some prior time (e.g., at operation 802) of a different visual media.

Alternatively, at 810, the techniques may enable rejection of the tagged faces or sub-images. This can be performed as shown in FIG. 6 or 7, though confirmation or failure to reject is replaced with an explicit selection to reject a tagged face or sub-image. Thus, a user may tap on face 604 or text 608 of FIG. 6 to reject the tag of face 604 as being Bella or select control 706 or one of portions 704 of FIG. 7 to reject the tagging. Tagging module 112 may then remove the tag on selection.

Example Device

Figure 9:
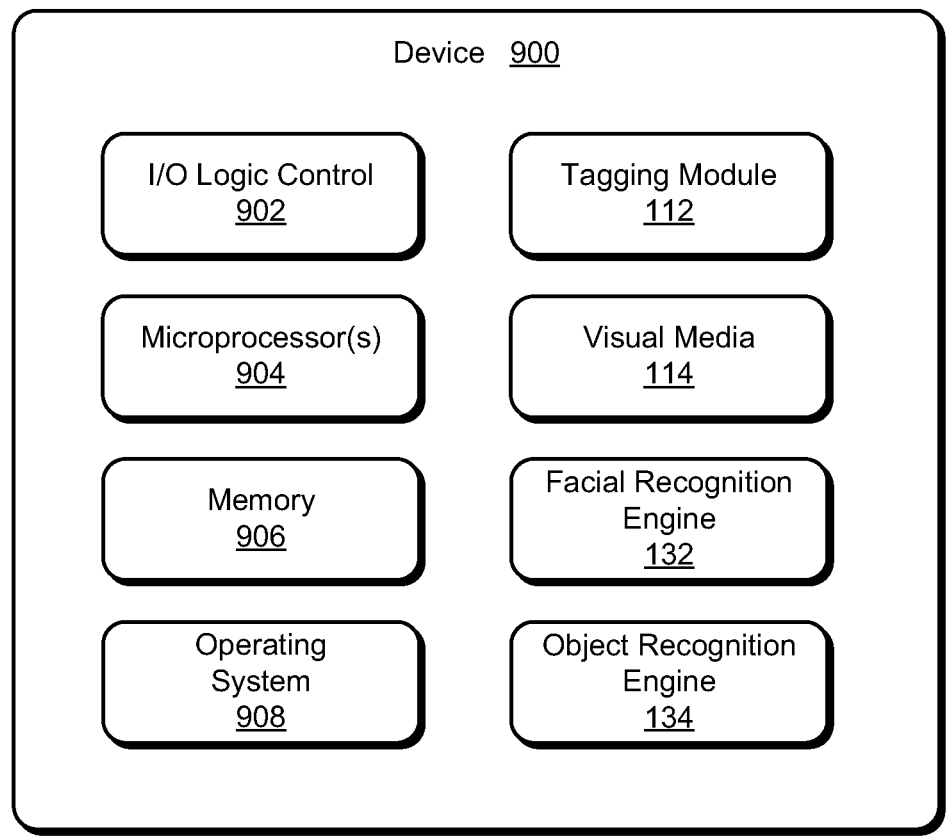
FIG. 9 illustrates various components of an example apparatus that can implement techniques for tagging visual media on a mobile device.

FIG. 9 illustrates various components of an example device 900 including tagging module 112 as well as including or having access to other components of FIGS. 1 and 2. These components can be implemented in hardware, firmware, and/or software and as described with reference to any of the previous FIGS. 1-8.

Example device 900 can be implemented in a fixed or mobile device being one or a combination of a media device, desktop computing device, television set-top box, video processing and/or rendering device, appliance device (e.g., a closed-and-sealed computing resource, such as some digital video recorders or global-positioning-satellite devices), gaming device, electronic device, vehicle, workstation, laptop computer, tablet computer, smartphone, video camera, camera, computing watch, computing ring, computing spectacles, and netbook.

Example device 900 can be integrated with electronic circuitry, a microprocessor, memory, input-output (I/O) logic control, communication interfaces and components, other hardware, firmware, and/or software needed to run an entire device. Example device 900 can also include an integrated data bus (not shown) that couples the various components of the computing device for data communication between the components.

Example device 900 includes various components such as an input-output (I/O) logic control 902 (e.g., to include electronic circuitry) and microprocessor(s) 904 (e.g., microcontroller or digital signal processor). Example device 900 also includes a memory 906, which can be any type of random, access memory (RAM), a low-latency nonvolatile memory (e.g., flash memory), read only memory (ROM), and/or other suitable electronic data storage. Memory 906 includes or has access to tagging module 112, visual media 114, facial recognition engine 132, and/or object recognition engine 134. Tagging module 112 is capable of performing one more actions described for the techniques, though other components may also be included.

Example device 900 can also include various firmware and/or software, such as an operating system 908, which, along with other components, can be computer-executable instructions maintained by memory 906 and executed by microprocessor 904. Example device 900 can also include other various communication interfaces and components, wireless LAN (WLAN) or wireless PAN (WPAN) components, other hardware, firmware, and/or software.

Other examples, capabilities, and functions of these thresholds are described with reference to descriptions and figures above. These thresholds, either independently or in combination with other modules or thresholds, can be implemented as computer-executable instructions maintained by memory 906 and executed by microprocessor 904 to implement various embodiments and/or features described herein.

Alternatively or additionally, any or all of these components can be implemented as hardware, firmware, fixed logic circuitry, or any combination thereof that is implemented in connection with the I/O logic control 902 and/or other signal processing and control circuits of example device 900. Furthermore, some of these components may act separate from device 900, such as when remote (e.g., cloud-based) services perform one or more operations for tagging module 112. For example, photo and video are not required to all be in one location, some may be on a user's smartphone, some on a server, some downloaded to another device (e.g., a laptop or desktop). Further, some images may be taken by a device, indexed, and then stored remotely, such as to save memory resources on the device.

CONCLUSION

Although techniques and apparatuses for tagging visual media on a mobile device have been described in language specific to structural features and/or methodological acts, the appended claims is not necessarily limited to the specific features or acts described. Rather, the specific features and acts are disclosed as example forms of implementing techniques and apparatuses for tagging visual media on a mobile device.

What is claimed is:

1. A computer-implemented method comprising:
    receiving, at a processor, an indication of a manual tagging selection to tag a person or object in a particular visual image;
    responsive to determining, by the processor, that the manual tagging selection of the person or of the object meets or exceeds a manual-selection tagging threshold for the person or object, performing, by the processor, facial or object recognition on multiple visual images to determine visual images having a face or sub-image recognized as matching the person or the object;
    enabling, by the processor and for each of the determined visual images, selection to confirm or reject the face or sub-image recognized as matching the person or the object in a particular determined visual image;
    responsive to receipt, at the processor, of an indication confirming the face or sub-image recognized in a particular determined visual image, tagging the face or the sub-image in the particular determined visual image to confirm that the face or the sub-image is correctly recognized as being the person or the object; and
    responsive to not receiving, at the processor, an indication rejecting the face or sub-image recognized in a particular determined visual image, tagging the face or the sub-image in the particular determined visual image to confirm that the face or the sub-image is correctly recognized as being the person or the object.

2. The method of claim 1, wherein the manual tagging selection is received through a mobile device, at least some of the multiple visual images are stored locally on the mobile device, and performing the facial or object recognition is performed on a majority of the visual images stored locally on the mobile device.

3. The method of claim 1, wherein determining that the manual tagging selection meets or exceeds a manual-selection tagging threshold determines that the manual tagging selection meets or exceeds a tagging threshold number.

4. The method of claim 3, wherein determining that the manual tagging selection meets or exceeds the tagging threshold number determines that the manual tagging selection meets or exceeds the threshold number within a tagging threshold time.

5. The method of claim 1, wherein enabling selection to confirm or reject the face or sub-image recognized in the determined visual images as matching the person or the object in a particular visual image presents each of the determined visual images with indicia indicating the face or the sub-image.

6. The method of claim 5, wherein presenting each of the determined visual images with indicia indicating the face or the sub-image is performed in rapid succession.

7. The method of claim 6, wherein a speed of the rapid succession is based on a confidence that the recognition of the faces or the sub-images is correct.

8. The method of claim 1, wherein enabling selection to confirm or reject the face or sub-image recognized in the determined visual images as matching the person or the object in a particular visual image presents portions of each of the determined visual images at one time or in one interface, the portions at least including the face or the sub-image.

9. The method of claim 8, wherein the faces or sub-images presented at one time or in one interface are tagged responsive to confirming the faces or the sub-images.

10. The method of claim 8, wherein sizes or numbers of the faces or the sub-images presented at one time or in one interface are determined based on a confidence that the recognition of the faces or the sub-images is correct.

11. The method of claim 1, wherein receipt of an indication confirming the face or sub-image in a particular determined visual image is an explicit confirmation, and wherein not receiving an indication rejecting the face or sub-image recognized in a particular determined visual image is an implicit confirmation.

* * * * *